(12) United States Patent
Huang et al.

(10) Patent No.: US 12,710,284 B2
(45) Date of Patent: Aug. 18, 2026

(54) MAP UPDATING METHOD, ELECTRONIC DEVICE AND NON-TRANSITORY COMPUTER READABLE STORAGE MEDIUM

(71) Applicant: HTC Corporation, Taoyuan City (TW)

(72) Inventors: Chun-Kai Huang, Taoyuan City (TW); Heng-Li Hsieh, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 162 days.

(21) Appl. No.: 18/656,602

(22) Filed: May 7, 2024

(65) Prior Publication Data

US 2025/0347531 A1 Nov. 13, 2025

(51) Int. Cl.
*G06T 7/73* (2017.01)
*G01C 21/00* (2006.01)
*G06V 10/70* (2022.01)

(52) U.S. Cl.
CPC ............ *G01C 21/3837* (2020.08); *G06T 7/74* (2017.01); *G06V 10/70* (2022.01)

(58) Field of Classification Search
CPC ....... G01C 21/3837; G06T 7/74; G06V 10/70
See application file for complete search history.

(56) References Cited

U.S. PATENT DOCUMENTS

| | | | | |
|---|---|---|---|---|
| 11,475,576 | B2 * | 10/2022 | Kim | G06V 20/58 |
| 11,915,499 | B1 * | 2/2024 | Kohler | G06V 30/1916 |
| 2021/0272317 | A1 * | 9/2021 | Patel | G06V 10/454 |
| 2024/0201776 | A1 * | 6/2024 | Jun | G06F 1/3203 |
| 2024/0244312 | A1 * | 7/2024 | Shindo | G06T 7/70 |
| 2024/0386724 | A1 * | 11/2024 | Nakayama | G06V 10/75 |
| 2025/0224251 | A1 * | 7/2025 | Heitzmann | G01C 21/1656 |
| 2025/0347531 | A1 * | 11/2025 | Huang | G01C 21/3837 |

* cited by examiner

*Primary Examiner* — Ashley L Redhead, Jr.
(74) *Attorney, Agent, or Firm* — CKC & Partners Co., LLC

(57) ABSTRACT

The present disclosure provides a map updating method and an electronic device. The map updating method is applicable to the electronic device configured to establish a map of an environment, and includes: performing an image recognition on a key frame, to determine if the key frame comprises a repetitive pattern; obtaining a plurality of map points corresponding to the repetitive pattern; generating a plurality of inferred map points according to the plurality of map points; and updating the map according to the plurality of inferred map points.

20 Claims, 10 Drawing Sheets

MAP UPDATING METHOD, ELECTRONIC DEVICE AND NON-TRANSITORY COMPUTER READABLE STORAGE MEDIUM

BACKGROUND

Field of Invention

This disclosure relates to a method, in particular to a map updating method applicable to an electronic device.

Description of Related Art

In existing systems using simultaneous localization and mapping (SLAM), the quality of image is critical for map construction. However, the quality of image is limited by the inherent accuracy of the camera practically. When the systems are applied to a wide environment, the systems are more difficult to obtain the features of distant objects accurately due to that limitation, which results in an inefficient map construction and a low accuracy of map. Thus, it is important to propose a new approach for constructing the map with improved efficiency and accuracy.

SUMMARY

An aspect of present disclosure relates to a map updating method applicable to an electronic device configured to establish a map of an environment, and including: performing an image recognition on a key frame, to determine if the key frame comprises a repetitive pattern; obtaining a plurality of map points corresponding to the repetitive pattern; generating a plurality of inferred map points according to the plurality of map points; and updating the map according to the plurality of inferred map points.

Another aspect of present disclosure relates to an electronic device. The electronic device is configured to establish a map of an environment, and includes a camera and a processor. The camera is configured to capture at least one image of the environment. The processor is coupled to the camera, and is configured to: obtain a key frame from the at least one image; perform an image recognition on the key frame, to determine if the key frame comprises a repetitive pattern; obtain a plurality of map points corresponding to the repetitive pattern; generate a plurality of inferred map points according to the plurality of map points; and update the map according to the plurality of inferred map points.

Another aspect of present disclosure relates to a non-transitory computer readable storage medium with a computer program to execute a map updating method applicable to an electronic device configured to establish a map of an environment, wherein the map updating method includes: performing an image recognition on a key frame, to determine if the key frame comprises a repetitive pattern; obtaining a plurality of map points corresponding to the repetitive pattern; generating a plurality of inferred map points according to the plurality of map points; and updating the map according to the plurality of inferred map points.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
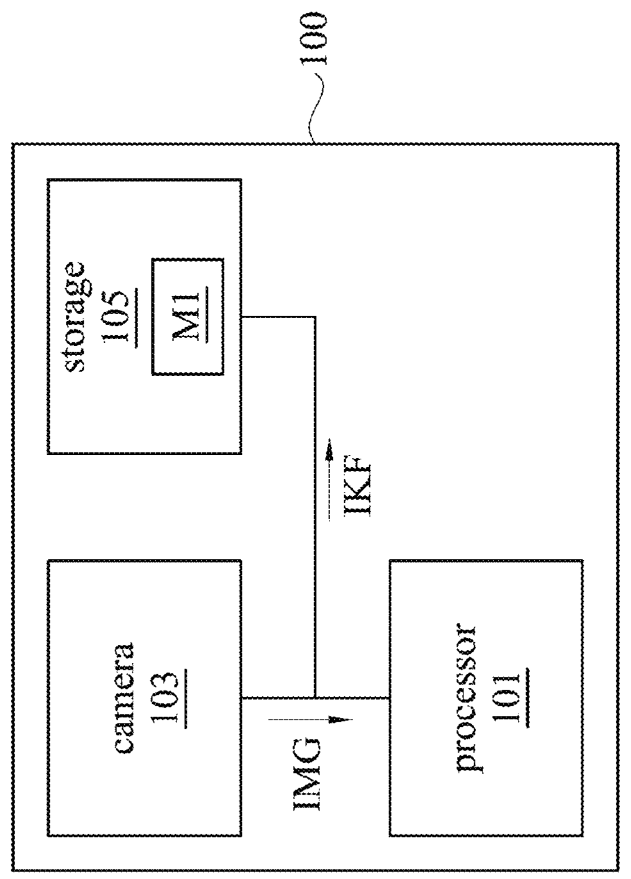
FIG. 1 is a block diagram of an electronic device in accordance with some embodiments of the present disclosure.

Referring to FIG. 1, FIG. 1 is a block diagram of an electronic device 100 in accordance with some embodiments of the present disclosure. In some embodiments, the electronic device 100 is capable of sensing an environment. In particular, the environment can be a public place (e.g., a train station, a gaming place, a restaurant, etc.) or a private place (e.g., a workplace, a house, etc.). Moreover, the electronic device 100 can be implemented by a wearable device (e.g., a head-mounted device (HMD)) worn by a user, a vehicle (e.g., a car) operated by the user, or an autonomous mobile robot (e.g., a clean robot, a sweeping robot, a food delivery robot, etc.), which means that the electronic device 100 can move to different spaces in the environment. In such way, the electronic device 100 can sense the different spaces in the environment, so as to establish a map M1 of the environment and to localize itself in the map M1 of the environment.

In some embodiments, as shown in FIG. 1, the electronic device 100 includes a processor 101, a camera 103 and storage 105. The processor 101 is communicatively and electrically coupled to the camera 103 and the storage 105, so as to cooperate with the camera 103 and the storage 105. For example, the camera 103 is configured to capture at least one image IMG of the environment. By receiving the image IMG of the environment from the camera 103, the processor 101 can use at least one visual-based localization technology (e.g., simultaneous localization and mapping (SLAM)) to perform operations such as calculating pose (i.e., orientation and position) of the electronic device 100, establishing the map M1 of the environment, localizing the electronic device 100 in the map M1 of the environment, etc. In addition, the storage 105 can store signals, data and/or information (e.g., the image IMG, the pose of the electronic device 100, the map M1, etc.) required by the processor 101 to perform the operations.

In accordance with the above embodiments, by the visual-based localization technology, the processor 101 can obtain a key frame IKF from the image IMG captured by the camera 103. In particular, when one image IMG is separated from a last/newest key frame (not shown) by a predetermined frame number or more, said one image IMG may be determined to be a candidate for the key frame IKF by the processor 101. Furthermore, the processor 101 may perform feature extract on said one image IMG, to determine if an amount of common feature points (not shown) of said one image IMG with the last key frame is equal to or less than a predetermined threshold. When the amount of the common feature points of said one image IMG with the last key frame is equal to or less than the predetermined threshold, the processor 101 sets said one image IMG as the key frame IKF, and stores the key frame IKF in the storage 105 as shown in FIG. 1. The processor 101 can use the key frame IKF to update the map M1 and to calculate the pose of the electronic device 100 corresponding to the key frame IKF. By obtaining multiple key frames IKF one after another, the map M1 of the environment can be updated continuously, so that the completeness of establishment of the map M1 is ensured.

In the above embodiments, for those images IMG which are not set as the key frame IKF, the processor 101 only uses the relative relationship between those images IMG and the last key frame to simply estimate the pose of the electronic device 100. Afterwards, those images IMG may be abandoned, that is, those images IMG may not be stored in the storage 105.

In the above embodiments, the processor 101 can be implemented by a central processing unit (CPU), an application-specific integrated circuit (ASIC), a microprocessor, a system on a Chip (SoC) or other suitable processing circuits. The camera 103 can be implemented by an image capturing structure including multiple components such as lens, image sensor, image processor, etc. In addition, the storage 105 can be implemented by volatile memory, non-volatile memory, or the both.

It should be understood that the configuration of the electronic device 100 is not limited to the configuration shown in FIG. 1. For example, in some embodiments, the storage 105 is omitted from FIG. 1, and the signals, data and/or information required by the operations of the processor 101 can be stored in at least one remote unit (e.g., a server), and can be accessed by the processor 101 through a wireless communication (e.g., network).

Figure 2:
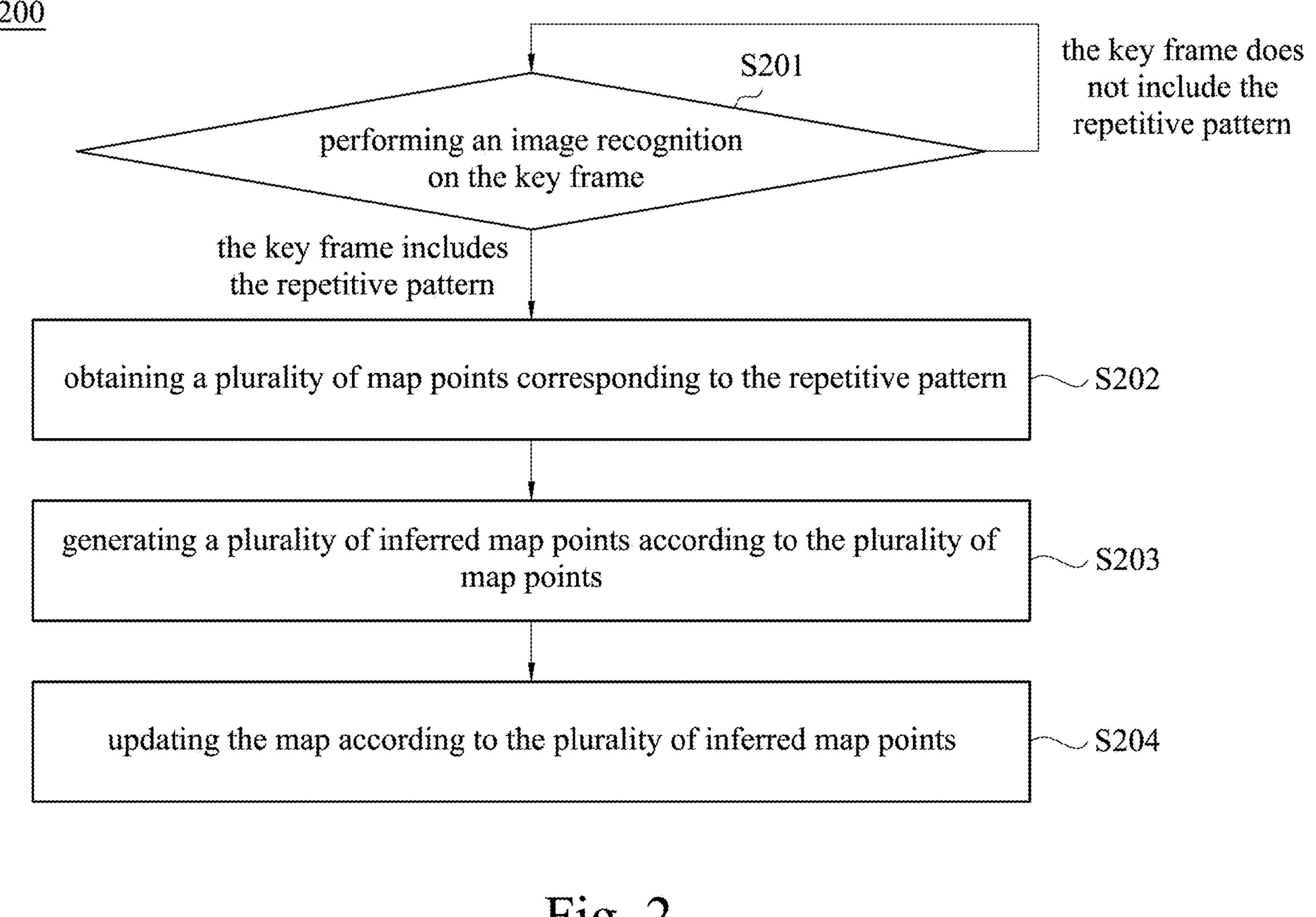
FIG. 2 is a flow diagram of a map updating method in accordance with some embodiments of the present disclosure.

The detailed operation of the electronic device 100 would be described below with reference to a map updating method 200. Referring to FIG. 2, FIG. 2 is a flow diagram of the map updating method 200 in accordance with some embodiments of the present disclosure. In some embodiments, the map updating method 200 is applicable to the electronic device 100, and includes operations S201-S204.

Figure 3:
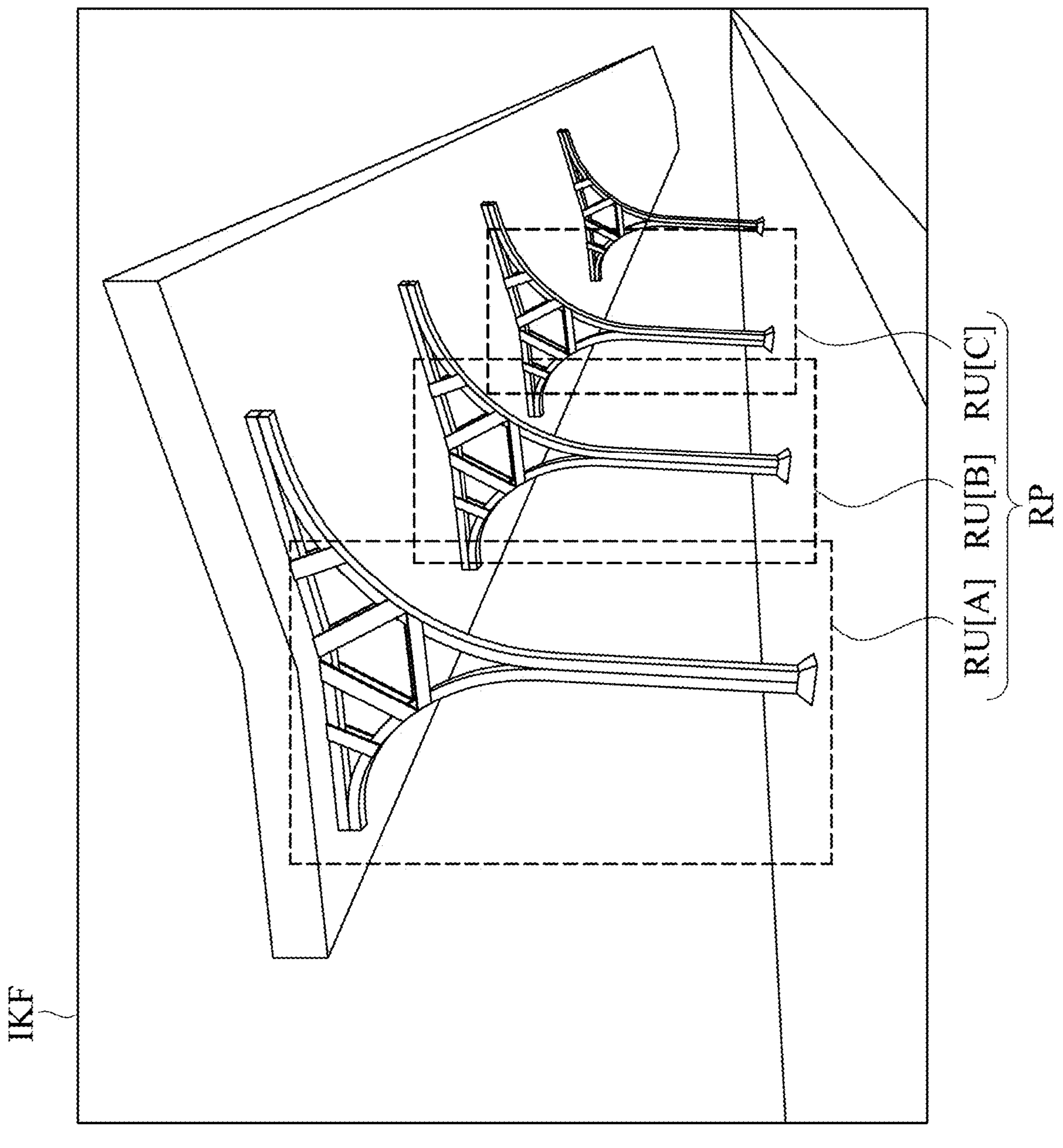
FIG. 3 is a schematic diagram of a key frame with a repetitive pattern in accordance with some embodiments of the present disclosure.

Generally, there are always some repetitive structures in the environment. For example, multiple beam-columns with same structure are spaced at equal intervals on the platform at a train station. In another example, multiple windows with same structure may be arranged in an array on the wall of a tall building. Accordingly, the key frame IKF obtained from the image IMG captured by the camera 103 may inadvertently include a repetitive pattern RP corresponding to one repetitive structure in the environment, which would be described with reference to FIG. 3. FIG. 3 is a schematic diagram of the key frame IKF with the repetitive pattern RP in accordance with some embodiments of the present disclosure.

In FIG. 3, the repetitive pattern RP is corresponding to the beam-columns on the platform at the train station, and three basic repeating units RU[A]-RU[C] of the repetitive pattern RP are labeled. Each of the basic repeating units RU[A]-RU[C] is corresponding to one of the beam-columns on the platform. Based on the field of view of the camera 103 corresponding to the key frame IKF in FIG. 3, the basic repeating unit RU[A] which has the largest size among the basic repeating units RU[A]-RU[C] is corresponding to the beam-column closest to the electronic device 100, and the basic repeating units RU[B]-RU[C] which are smaller than the basic repeating unit RU[A] may be corresponding to two beam-columns directly following the beam-column closest to the electronic device 100. In addition, the basic repeating unit RU[C] is smaller than the basic repeating unit RU[B], which means the beam-column corresponding to the basic repeating unit RU[C] is further away from the beam-column corresponding to the basic repeating unit RU[A] than the beam-column corresponding to the basic repeating unit RU[B].

In the following embodiments, if the reference character of component(s) is used without specifying its alphabetic or numerical index, it indicates that reference character of component(s) is referred to any one in the group to which the component(s) belongs. For example, the basic repeating unit RU is referred to any one of the basic repeating units RU[A]-RU[C].

In the above embodiments, it should be understood that the repetitive pattern RP can include at least two basic repeating units RU. That is to say, if there are at least two basic repeating units RU in the key frame IKF, it may say that the key frame IKF includes the repetitive pattern RP.

In some embodiments, operation S201 is performed when the processor 101 obtains the key frame IKF from the image IMG captured by the camera 103.

In operation S201, the electronic device 100 performs image recognition on the key frame IKF by the processor 101, to determine if the key frame IKF includes the repetitive pattern RP or not. In particular, the image recognition can be implemented by any algorithm or well-trained neural network model capable of detecting if there are at least two basic repeating units RU in image data (i.e., the key frame IKF). In some embodiments, as shown in FIG. 2, when the processor 101 determines that the key frame IKF does not include the repetitive pattern RP, operation S201 may be executed again to perform the image recognition on another newly obtained key frame IKF.

Figure 4:
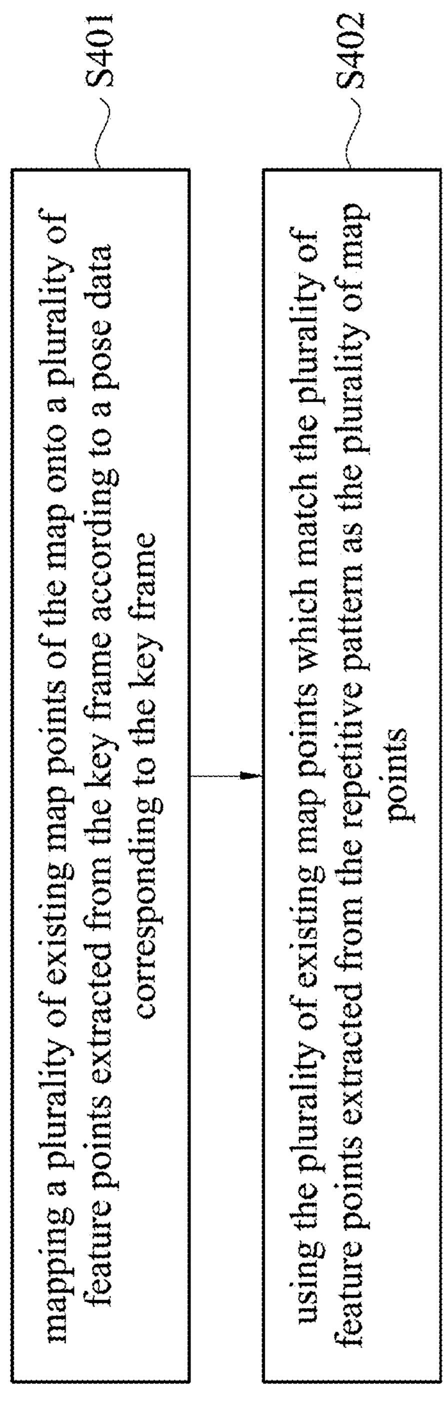
FIG. 4 is a flow diagram of an operation of the map updating method in accordance with some embodiments of the present disclosure.
Figure 7:
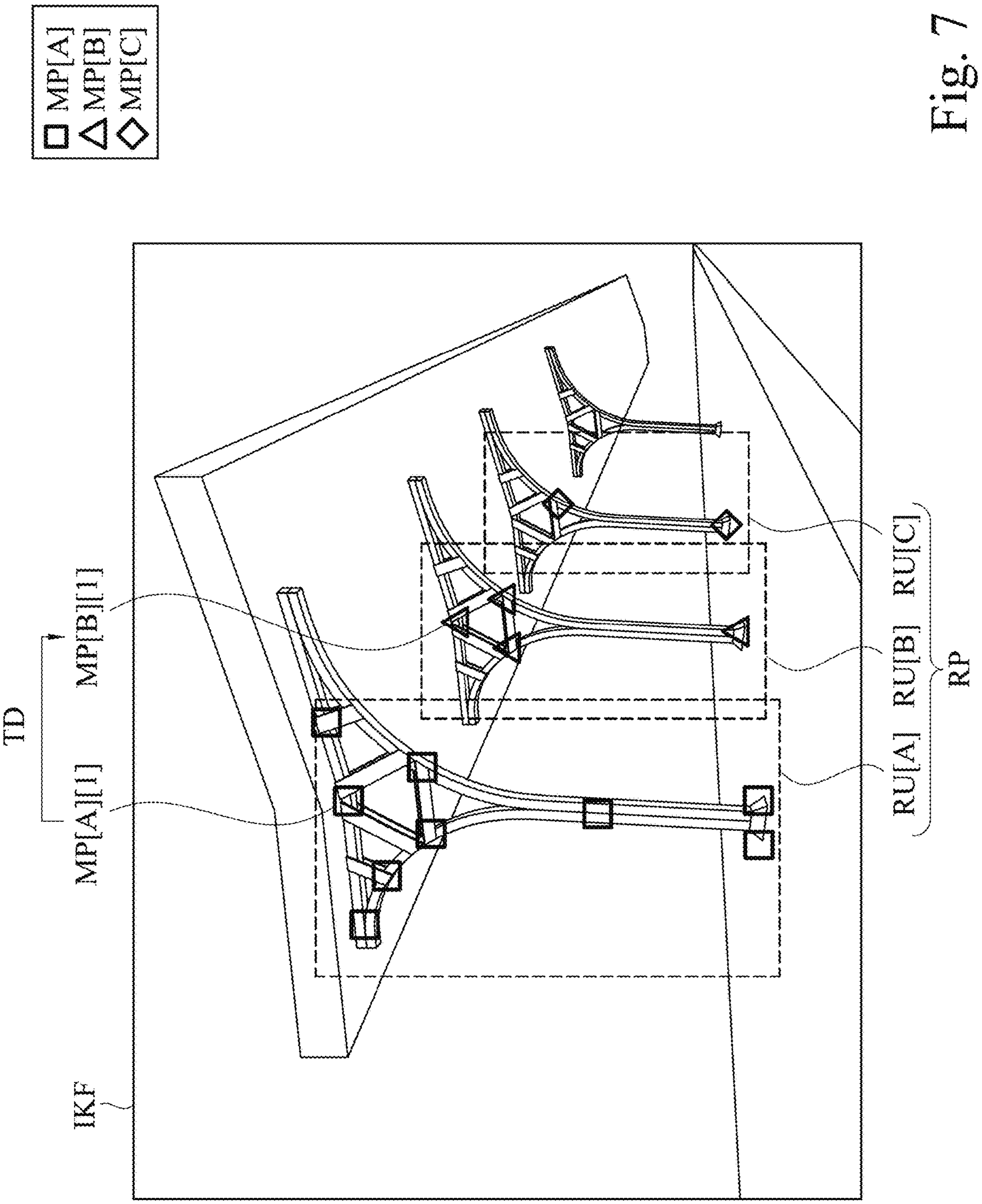
FIG. 7 is a schematic diagram of classifying map points corresponding to the repetitive pattern in accordance with some embodiments of the present disclosure.

In the embodiments of FIG. 3, the processor 101 determines that the key frame IKF includes the repetitive pattern RP, so that operation S202 is executed. In operation S202, the electronic device 100 obtains a plurality of map points MP (which are shown in FIG. 7) corresponding to the repetitive pattern RP by the processor 101, which would be described with reference to FIG. 4. FIG. 4 is a flow diagram of operation S202 of the map updating method 200 in accordance with some embodiments of the present disclosure. In some embodiments, as shown in FIG. 4, operation S202 includes sub-operations S401-S402.

Figure 5:
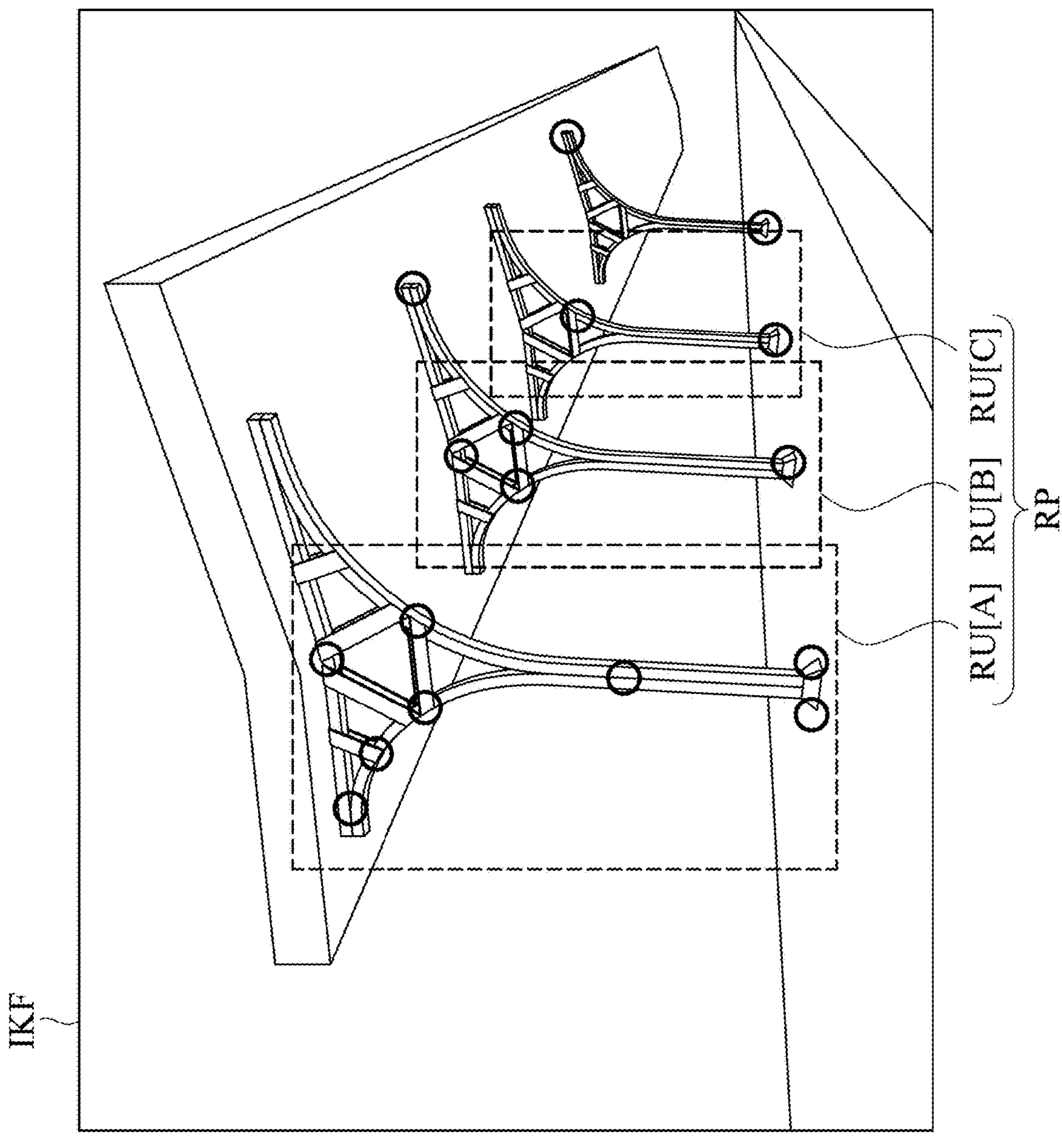
FIG. 5 is a schematic diagram of a mapping of existing map points to the key frame in accordance with some embodiments of the present disclosure.

In sub-operation S401, the processor 101 maps a plurality of existing map points MPE of the map M1 onto a plurality of feature points (not shown) extracted from the key frame IKF according to a pose data corresponding to the key frame IKF, which would be described with reference to FIG. 5. FIG. 5 is a schematic diagram of a mapping of the existing map points MPE to the key frame IKF in accordance with some embodiments of the present disclosure. In some embodiments, the pose of the electronic device 100 when the key frame IKF (or the image IMG corresponding to the key frame IKF) is captured is calculated by the processor 101 as the pose data corresponding to the key frame IKF. Moreover, each of the existing map points MPE may include corresponding descriptor capable of indicating spatial coordinate in the map M1 and features (e.g., color, shape, texture, etc.). Accordingly, the processor 101 can find the existing map points MPE which can be projected onto the key frame IKF according to the descriptors of the existing map points MPE and the pose data corresponding to the key frame IKF.

In accordance with the above descriptions, each of the feature points extracted from the key frame IKF may include corresponding descriptor capable of indicating planar coordinate on the key frame IKF and features (e.g., color, shape, texture, etc.). The processor 101 can further match the existing map points MPE projected onto the key frame IKF to the feature points extracted from the key frame IKF according to the descriptors of the existing map points MPE and the descriptors of the feature points. Accordingly, the existing map points MPE matching or mapped onto the feature points extracted from the repetitive pattern RP in the key frame IKF can be obtained by the processor 101, and sub-operation S402 will be executed.

In sub-operation S402, the processor 101 use the existing map points MPE which match the feature points extracted from the repetitive pattern RP as the map points MP corresponding to the repetitive pattern RP. Then, operation S203 will be executed.

Figure 6:
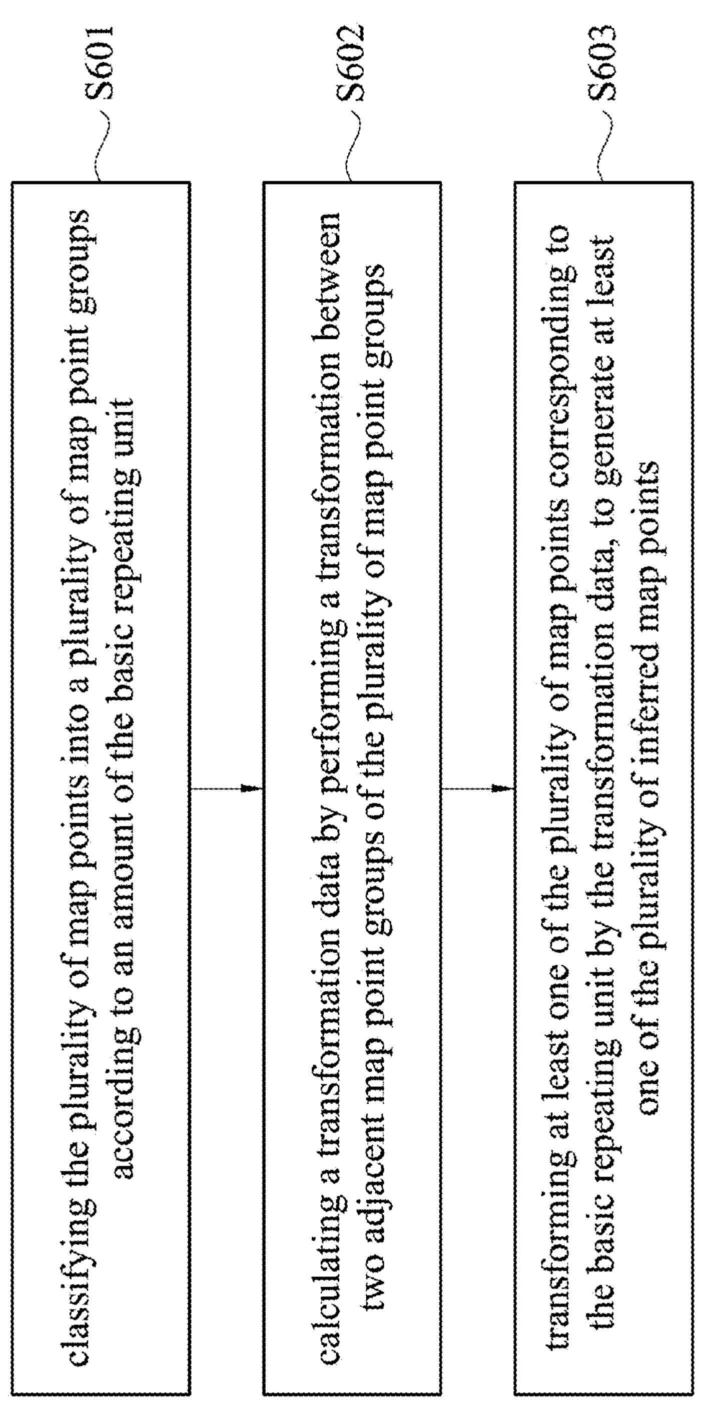
FIG. 6 is a flow diagram of an operation of the map updating method in accordance with some embodiments of the present disclosure.
Figure 8:
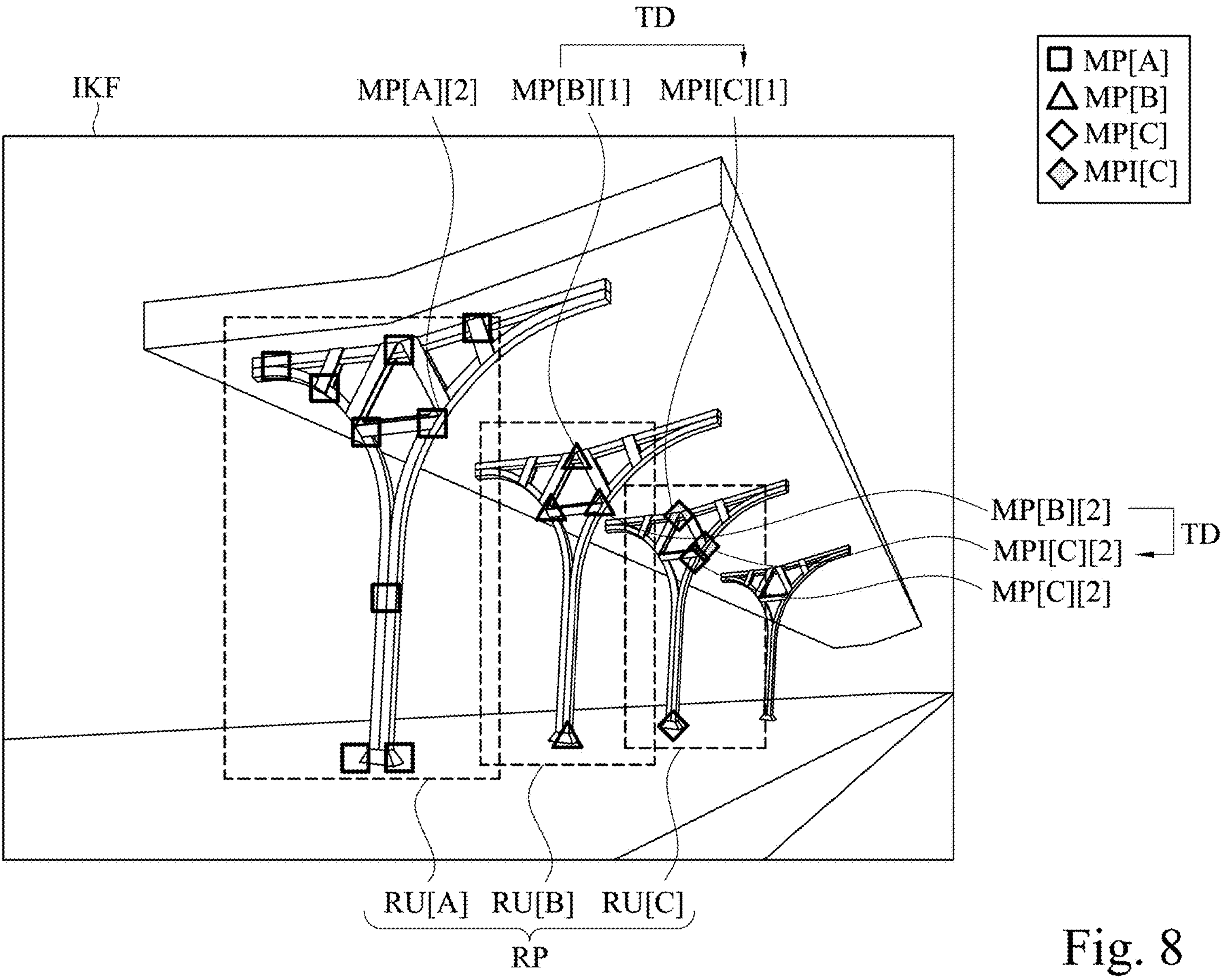
FIG. 8 is a schematic diagram of generating inferred map points according to the map points corresponding to the repetitive pattern in accordance with some embodiments of the present disclosure.

Referring to FIG. 2 again, in operation S203, the electronic device 100 generates a plurality of inferred map points MPI (which are shown in FIG. 8) according to the map points MP (which are corresponding to the repetitive pattern RP) by the processor 101, which would be described with reference to FIG. 6. FIG. 6 is a flow diagram of operation S203 of the map updating method 200 in accordance with some embodiments of the present disclosure. In some embodiments, as shown in FIG. 6, operation S203 includes sub-operations S601-S603.

In sub-operation S601, the processor 101 classifies the map points MP into a plurality of map point groups according to an amount of the basic repeating unit RU. Referring to FIG. 7, FIG. 7 is a schematic diagram of classifying the map points MP corresponding to the repetitive pattern RP in accordance with some embodiments of the present disclosure. It can be seen from the descriptions of FIGS. 4-5 and 7, the map points MP shown in FIG. 7 may be the existing map points MPE which match the feature points extracted from the repetitive pattern RP in FIG. 5.

In the embodiments of FIG. 7, because there are three basic repeating units RU[A]-RU[C], the map points MP are classified into three map point groups. In particular, the map points MP[A] which match the feature points extracted from the basic repeating unit RU[A] can be referred as a first map point group (represented by hollow squares in FIG. 7), the map points MP[B] which match the feature points extracted from the basic repeating unit RU[B] can be referred as a second map point group (represented by hollow triangles in FIG. 7), and the map points MP[C] which match the feature points extracted from the basic repeating unit RU[C] can be referred as a third map point group (represented by hollow rhombuses in FIG. 7). Moreover, the first map point group is directly adjacent to (or followed by) the second map point group in the map M1, and the second map point group is directly adjacent to (or followed by) the third map point group in the map M1.

In accordance with the descriptions of FIG. 7, since those beam-columns corresponding to the basic repeating units RU[A]-RU[C] are similar with respect to the structure, those three map point groups should be similar with respect to the spatial distribution of the map points MP theoretically. However, due to the inherent limitation of the camera 103, the second and third map groups, which corresponding to the distant beam-columns, may risk the inaccuracy and/or incompleteness of the map points MP[B] and MP[C]. Because the basic repeating unit RU[A] is corresponding to the closest beam-column, the spatial distribution of the map points MP[A] corresponding to the basic repeating unit RU[A] in the map M1 should be the most accurate and complete practically. Also, as shown in FIG. 7, the amount of the map points MP[A] in the first map point group corresponding to the basic repeating unit RU[A] may be the largest among the three map point groups. That is to say, the map points MP[A] in the first map point group can be used as the most reliable reference to patch the map points MP[B] and MP[C] corresponding to the basic repeating units RU[B]-RU[C] (the first map point group can be referred as a reference map point group). In addition, in condition that those beam-columns corresponding to the basic repeating units RU[A]-RU[C] are spaced at equal intervals on the platform, the relationship between the directly adjacent first and second map point groups can also be used to patch the map points MP[C] in the third map point group.

Accordingly, in sub-operation S602, the processor 101 calculates a transformation data TD by performing a transformation between two adjacent map point groups. In some embodiments, the processor 101 performs the transformation between the first map point group and the second map point group to calculate the transformation data TD. For example, as shown in FIG. 7, the processor 101 transforms the map point MP[A][1] in the first map point group into the map point MP[B][1] in the second map point group, so as to obtain data capable of making the map point MP[A][1] to have the spatial coordinate of the map point MP[B][1] as the transformation data TD. It is noted that the spatial relationship of the map point MP[A][1] with other map points MP[A] in the first map point group is similar to the spatial relationship of the map point MP[B][1] with other map points MP[B] in the second map point group, which means that the map point MP[A][1] is corresponding to the map point MP[B][1]. Thus, other map points MP[A], which can be corresponding to other map points MP[B], can be transformed to obtain their corresponding transformation data TD.

As can be seen from the descriptions of sub-operations S601-S602, in some embodiments, the electronic device 100 obtains the transformation data TD by classifying the map points MP according to the basic repeating unit RU of the repetitive pattern RP.

In sub-operation S603, the processor 101 transforms at least one of the map points MP corresponding to the basic repeating unit RU by the transformation data TD, to generate at least one of the inferred map points MPI. Referring to FIG. 8, FIG. 8 is a schematic diagram of generating the inferred map points MPI according to the map points MP corresponding to the repetitive pattern RP in accordance with some embodiments of the present disclosure.

In some embodiments of sub-operation S603, as shown in FIG. 8, the processor 101 multiplies the map point MP[B][1] in the second map point group by the transformation data TD, to generate the inferred map point MPI[C][1] for the third map point group. Because the transformation data TD used to generate the inferred map point MPI[C][1] is obtained by transforming the map point MP[A][1] in the first map point group into the map point MP[B][1] in the second map point group, the spatial relationship of the inferred map point MPI[C][1] with the map points MP[C] in the third map point group is similar to the spatial relationship of the map point MP[A][1] with other map points MP[A] in the first map point group (or the spatial relationship of the map point MP[B][1] with other map points MP[B] in the second map point group).

As shown in FIG. 8 again, the processor 101 multiplies the map point MP[B][2] in the second map point group by the transformation data TD, to generate the inferred map point MPI[C][2] for the third map point group. It should be understood that the transformation data TD used to generate the inferred map point MPI[C][2] can be obtained by transforming the map point MP[A][2] in the first map point group into the map point MP[B][2] in the second map point group.

Also, in the embodiments of FIG. 8, other map points MP[B] in the second map point group can be multiplied by their corresponding transformation data TD, to generate other inferred map points MPI[C] (represented by rhombuses filled with dot in FIG. 8) for the third map point group. Thus, because the amount of the map points MP[B] in the second map point group is 4 in FIG. 8, the amount of the inferred map points MPI[C] generated for the third map point group may be 4. Accordingly, in some embodiments, the amount of the inferred map points MPI[C] generated for the third map point group is greater than the amount (i.e., 2 in FIGS. 7 and 8) of the map points MP[C] in the third map point group. However, the present disclosure is not limited thereto, and the map points MP[C] in the third map point group in FIGS. 7 and 8 is shown for illustrative purpose. In some embodiments, the amount of the inferred map points MPI[C] generated for the third map point group may be equal to the amount of the map points MP[C] in the third map point group.

Figure 9:
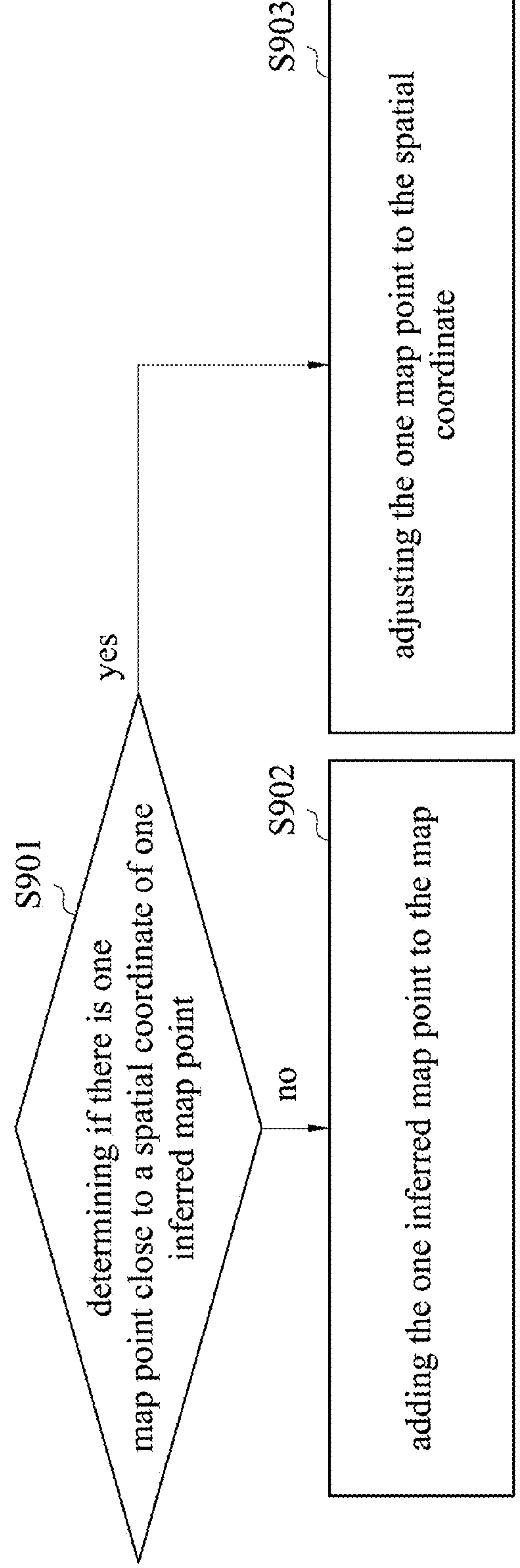
FIG. 9 is a flow diagram of an operation of the map updating method in accordance with some embodiments of the present disclosure.

Referring to FIG. 2 again, in operation S204, the electronic device 100 updates the map M1 according to the inferred map points MPI by the processor 101, which would be described with reference to FIG. 9. FIG. 9 is a flow diagram of operation S204 of the map updating method 200 in accordance with some embodiments of the present disclosure. In some embodiments, as shown in FIG. 9, operation S204 includes sub-operations S901-S903.

In sub-operation S901, the processor 101 determines if there is one map point MP close to a spatial coordinate of one inferred map point MPI. In particular, when a distance difference between the spatial coordinate of the map point MP and the spatial coordinate of the inferred map point MPI is greater than or is equal to a preset minimal distance, the processor 101 determines that the map point MP is not close to the spatial coordinate of the inferred map point MPI. When the distance difference between the spatial coordinate of the map point MP and the spatial coordinate of the inferred map point MPI is smaller than the preset minimal distance, the processor 101 determines that the map point MP is close to the spatial coordinate of the inferred map point MPI. In some embodiments of sub-operation S901, the processor 101 determines that none of the map points MP is close to the spatial coordinate of the inferred map point MPI[C][I], so that sub-operation S902 is executed. In sub-operation S902, the processor 101 adds the inferred map point MPI[C][I] to the map M1.

In some embodiments of sub-operation S901, the processor 101 determines that the map point MP[C][2] is close to the spatial coordinate of the inferred map point MPI[C][2], so that sub-operation S903 is executed. In sub-operation S903, the processor 101 adjusts the map point MP[C][2] to the spatial coordinate of the inferred map point MPI[C][2]. It should be understood that the spatial coordinate of the map point MP[C][2] is different from the spatial coordinate of the inferred map point MPI[C][2] before the map point MP[C][2] is adjusted. In accordance with the embodiments that the amount of the inferred map points MPI[C] generated for the third map point group is 4, by adding the inferred map point MPI[C] and/or adjusting the map point MP[C], the total amount of the inferred map points MPI[C] and the map points MP[C] in the third map point group can be equal to the amount of the map points MP[B] in the second map point group.

In some further embodiments, when the map point MP[C][2] is adjusted to the spatial coordinate of the inferred map point MPI[C][2], one feature point, which matches the map point MP[C][2] before the map point MP[C][2] is adjusted, is also adjusted by the processor 101. In particular, the inferred map point MPI[C][2] may be projected onto one planar coordinate on the key frame IKF according to the pose data corresponding to the key frame IKF. Said one feature point may be adjusted from another one planar coordinate indicated by its descriptor to said one planar coordinate on the key frame IKF. By such operations, the map point MP[C][2] at the spatial coordinate of the inferred map point MPI[C][2] can be mapped onto said one feature point at said one planar coordinate. By also adjusting said one feature point extracted from the key frame IKF, it may facilitate matching this key frame IKF with another newly obtained key frame IKF. In addition, when the inferred map point MPI[C][1] is added to the map M1 (i.e., sub-operation S902), a new feature point may be added to the key frame IKF at one planar coordinate where the inferred map point MPI[C][1] is projected onto the key frame IKF, which is equivalent to adding the inferred map point MPI[C][1] on the key frame IKF.

In the embodiments of FIG. 8, the processor 101 multiplies the map points MP[B] in the second map point group by the transformation data TD, to generate the inferred map points MPI[C] for the third map point group. However, the present disclosure is not limited thereto. For example, referring to FIG. 10, FIG. 10 is a schematic diagram of generating the inferred map points MPI according to the map points MP corresponding to the repetitive pattern RP in accordance with some embodiments of the present disclosure.

Figure 10:
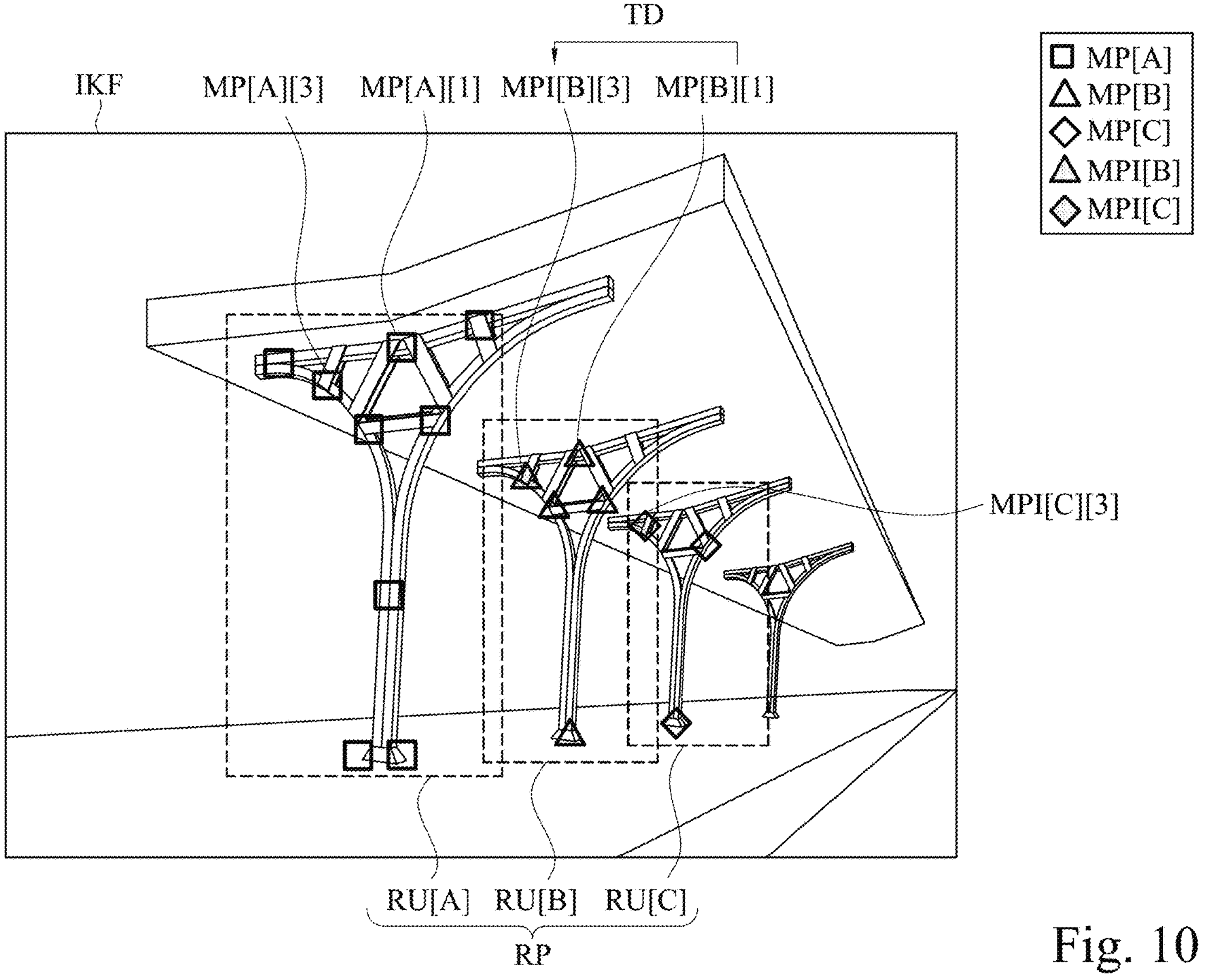
FIG. 10 is a schematic diagram of generating the inferred map points according to the map points corresponding to the repetitive pattern in accordance with some embodiments of the present disclosure.

In some embodiments, as shown in FIG. 10, the processor 101 multiplies the map point MP[B][1] in the second map point group by the transformation data TD, to generate the inferred map point MPI[B][3] for the second map point group. It should be understood that the transformation data TD used to generate the inferred map point MPI[B][3] can be obtained by transforming the map point MP[A][1] in the first map point group into the map point MP[A][3] in the first map point group. By analogy, the processor 101 can generate other inferred map points MPI[B] (represented by triangles filled with dot in FIG. 10) for the second map point group, so that the amount of the map points MP[A] in the first map point group (i.e., the reference map point group) is equal to a sum of the amount of the inferred map points MPI[B] generated for the second map point group and the amount of the map points MP[B] in the second map point group.

In some further embodiments of FIG. 10, the processor 101 multiplies the inferred map point MPI[B][3] generated for the second map point group by the transformation data TD, to generate the inferred map point MPI[C][3] for the third map point group. It should be understood that the transformation data TD used to generate the inferred map point MPI[C][3] can be obtained by transforming the map point MP[A][3] in the first map point group into the inferred map point MPI[B][3] generated for the second map point group. However, the present disclosure is not limited herein. For example, the processor 101 can multiply one map point MP[C] in the third map point group by the corresponding transformation data TD, to generate the inferred map point MPI[C][3] for the third map point group. In particular, this corresponding transformation data TD can be obtained by performing the transformation between two corresponding map points MP[A] in the first map point group. By analogy, the processor 101 can generate other inferred map points MPI[C] for the third map point group, so that the amount of the map points MP[A] in the first map point group (i.e., the reference map point group) is equal to a sum of the amount of the inferred map points MPI[C] generated for the third map point group and the amount of the map points MP[C] in the third map point group.

It should be understood that the map updating method 200 is not limited to the flow diagram as shown in FIG. 2. For example, in some embodiments, when the processor 101 determines that the key frame IKF does not include the repetitive pattern RP, the processor 101 will update the map M1 by using the key frame IKF, and will obtain another key frame IKF. Generally, when using the key frame IKF to update the map M1, the processor 101 may create multiple new map points in the map M1 and/or adjust the descriptor of at least one existing map point MPE in the map M1 according to the feature points extracted from the key frame IKF. It is noted that these new map points created in the map M1 according to the feature points extracted from the key frame IKF are different from the aforementioned inferred map points MPI added to the map M1, because the inferred map points MPI are generated from the existing map point MPE in the map M1, not from the feature points.

In some embodiments, the inferred map points MPI are stored in the map M1 in the form of inference records. For example, the inferred map points MPI[C][1] in FIG. 8 can be recorded as an inference equation: MPI[C][1]=MP[B][1] *TD(MP[A][1]: MP[B][1]), in which TD(MP[A][1]:MP[B][1]) in the inference equation represents the transformation data TD for transforming the map point MP[A][1] into the map point MP[B][1]. When the spatial coordinate of the map point MP[A][1] (and/or the map point MP[B][1]) is updated according to the feature points extracted from the key frame IKF, the inferred map point MPI[C][1] will also be updated due to the change(s) in the inference equation. Further, since the repetitive pattern RP involves the orderly arrangement of similar objects (e.g., the beam-columns on the platform), the map point groups will also be similar in the intensity of corresponding feature points, thus resulting in the closer feature points having higher accuracy. Under this characteristic, the inference will occur on the map point groups corresponding to more distant objects (e.g., the second or third map point group), and there will be no phenomenon of circular inference.

From the above inference method, it can be known that the second and third map point groups have the opportunity to obtain the same number of the map points MP as the first map point group using the inference method. In practice, in some embodiments, these inferred map points MPI are first stored in an inference collection library (stored in the storage 105 or not) and are not immediately added to the map M1. Further, before the inferred map point MPI is added to the map M1 and the corresponding key frame IKF, the existing map points MPE are checked. Once the inferred map point MPI is projected onto the key frame IKF and there are no other map points MP around it, it will be added to the key frame IKF and the map M1 (i.e., sub-operation S902). In some embodiments, all map points (which mean the map points MP and the inferred map points MPI) on the key frame IKF maintain the preset minimal distance from each other, firstly to ensure all map points are evenly distributed on the key frame IKF, and secondly to effectively control the quantity and quality of all map points on the key frame IKF.

There are many methods to keep distance between all map points on the key frame IKF. The present disclosure lists a simple example of evenly dividing the key frame IKF into N equal parts, with only one map point (map point MP or inferred map point MPI) allowed in each part. In accordance with the aforementioned further embodiments of sub-operation S902, when the new feature point is added to the key frame IKF, the processor 101 can further determine if there is only the new feature point at a part of the N equal parts of the key frame IKF. When there is only the new feature point at the part of the N equal parts of the key frame IKF, the new feature point is maintained on the key frame. However, the present disclosure is not limited herein. There are various ways to evenly distribute all map points, and this example is only used to illustrate one of the conditions for sub-operation S901.

As can be seen from the above embodiments of the present disclosure, by obtaining the map points MP corresponding to the repetitive pattern RP in the key frame IKF, the electronic device 100 of the present disclosure can generates the inferred map points MPI to patch those map point groups (i.e., the second map point group, the third map point group) which may have the problem of inaccuracy and/or incompleteness due to the inherent limitation of the camera 103. Moreover, these inferred map points MPI may help the electronic device 100 reduce the number of times and time of period to sense the environment required for map construction. Therefore, the electronic device 100 and the map updating method 200 have advantages of improvement in the efficiency and accuracy of map construction, etc.

The disclosed methods, may take the form of a program code (i.e., executable instructions) embodied in tangible media, such as floppy diskettes, CD-ROMS, hard drives, or any other transitory or non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A map updating method, applicable to an electronic device configured to establish a map of an environment using simultaneous localization and mapping (SLAM), and comprising:

performing an image recognition on a key frame, which is obtained from a plurality of images of the environment using the SLAM, to determine if the key frame comprises a repetitive pattern;

obtaining a plurality of map points corresponding to the repetitive pattern from a plurality of existing map points using the SLAM;

generating a plurality of inferred map points by grouping the plurality of map points according to the repetitive pattern; and updating the plurality of existing map points of the map according to the plurality of inferred map points.

2. The map updating method of claim 1, wherein obtaining the plurality of map points corresponding to the repetitive pattern comprises:

mapping the plurality of existing map points of the map onto a plurality of feature points extracted from the key frame according to a pose data corresponding to the key frame; and using the plurality of existing map points which match the plurality of feature points extracted from the repetitive pattern as the plurality of map points.

3. The map updating method of claim 1, wherein generating the plurality of inferred map points according to the plurality of map points comprises:

obtaining a transformation data by classifying the plurality of map points according to a basic repeating unit of the repetitive pattern; and transforming at least one of the plurality of map points corresponding to the basic repeating unit by the transformation data, to generate at least one of the plurality of inferred map points.

4. The map updating method of claim 3, wherein obtain the transformation data by classifying the plurality of map points according to the basic repeating unit of the repetitive pattern comprises:

classifying the plurality of map points into a plurality of map point groups according to an amount of the basic repeating unit; and calculating the transformation data by performing a transformation between two adjacent map point groups of the plurality of map point groups.

5. The map updating method of claim 4, wherein an amount of map points in one of the two adjacent map point groups is greater than an amount of map points in the other of the two adjacent map point groups.

6. The map updating method of claim 3, wherein transforming the at least one of the plurality of map points corresponding to the basic repeating unit by the transformation data, to generate the at least one of the plurality of inferred map points comprises:

multiplying map points in a first map point group of the plurality of map points by the transformation data, to generate inferred map points for a second map point group of the plurality of map points, wherein the first map point group is directly adjacent to the second map point group.

7. The map updating method of claim 6, wherein an amount of the inferred map points for the second map point group is greater than or equal to an amount of map points in the second map point group.

8. The map updating method of claim 6, wherein a sum of an amount of the inferred map points for the second map point group and an amount of map points in the second map point group is equal to an amount of map points of a reference map point group of the plurality of map points.

9. The map updating method of claim 1, wherein updating the map according to the plurality of inferred map points comprises:

when none of the plurality of map points is close to a spatial coordinate of one of the plurality of inferred map points, adding the one of the plurality of inferred map points to the map.

10. The map updating method of claim 9, further comprising:

adding a new feature point to the key frame at a planar coordinate where the one of the plurality of inferred map points is projected onto the key frame.

11. The map updating method of claim 1, wherein updating the map according to the plurality of inferred map points comprises:

when one of the plurality of map points is close to a spatial coordinate of one of the plurality of inferred map points, adjusting the one of the plurality of map points to the spatial coordinate.

12. The map updating method of claim 11, further comprising:

adjusting a feature point to a planar coordinate on the key frame, wherein the one of the plurality of map points at the spatial coordinate is mapped onto the feature point at the planar coordinate.

13. The map updating method of claim 1, wherein when the key frame does not comprise the repetitive pattern, the map updating method further comprises:

updating the map by using the key frame; and obtaining another key frame.

14. An electronic device, configured to establish a map of an environment using simultaneous localization and mapping (SLAM), and comprising:

a camera, configured to capture at least one image of the environment; and a processor, coupled to the camera, and configured to:

obtain a key frame from the at least one image using the SLAM;

perform an image recognition on the key frame, to determine if the key frame comprises a repetitive pattern;

obtain a plurality of map points corresponding to the repetitive pattern from a plurality of existing map points using the SLAM;

generate a plurality of inferred map points by grouping the plurality of map points according to the repetitive pattern; and update the plurality of existing map points of the map according to the plurality of inferred map points.

15. The electronic device of claim 14, wherein the processor is configured to map the plurality of existing map points of the map onto a plurality of feature points extracted from the key frame according to a pose data corresponding to the key frame, and is configured to use the plurality of existing map points which match the plurality of feature points extracted from the repetitive pattern as the plurality of map points.

16. The electronic device of claim 14, wherein the processor is configured to obtain a transformation data by classifying the plurality of map points according to a basic repeating unit of the repetitive pattern, and is configured to transform at least one of the plurality of map points corresponding to the basic repeating unit by the transformation data, to generate at least one of the plurality of inferred map points.

17. The electronic device of claim 16, wherein the processor is configured to classify the plurality of map points into a plurality of map point groups according to an amount of the basic repeating unit, and is configured to calculate the transformation data by performing a transformation between two adjacent map point groups of the plurality of map point groups.

18. The electronic device of claim 16, wherein the processor is configured to multiply map points in a first map point group of the plurality of map points by the transformation data, to generate inferred map points for a second map point group of the plurality of map points, wherein the first map point group is directly adjacent to the second map point group, and an amount of the inferred map points for the second map point group is greater than or equal to an amount of map points in the second map point group.

19. The electronic device of claim 14, wherein when none of the plurality of map points is close to a spatial coordinate of one of the plurality of inferred map points, the processor is configured to add the one of the plurality of inferred map points to the map, wherein when one of the plurality of map points is close to a spatial coordinate of one of the plurality of inferred map points, the processor is configured to adjust the one of the plurality of map points to the spatial coordinate.

20. A non-transitory computer readable storage medium with a computer program to execute a map updating method applicable to an electronic device configured to establish a map of an environment using simultaneous localization and mapping (SLAM), wherein the map updating method comprises:

performing an image recognition on a key frame, which is obtained from a plurality of images of the environment using the SLAM, to determine if the key frame comprises a repetitive pattern;

obtaining a plurality of map points corresponding to the repetitive pattern from a plurality of existing map points using the SLAM;

generating a plurality of inferred map points by grouping the plurality of map points according to the repetitive pattern; and updating the plurality of existing map points of the map according to the plurality of inferred map points.

* * * * *